Dec. 9, 1969     G. B. SPEEN ET AL     3,482,454
GAS LUBRICATED REACTION GYROSCOPE
Filed Oct. 23, 1965
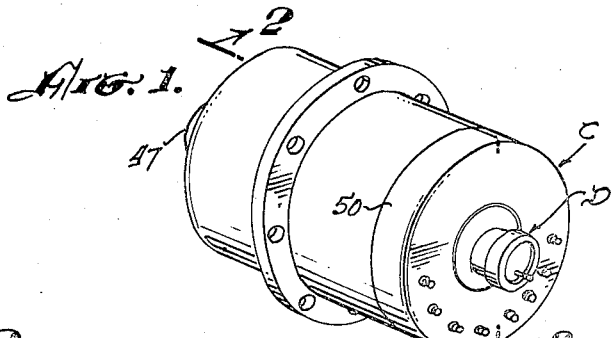
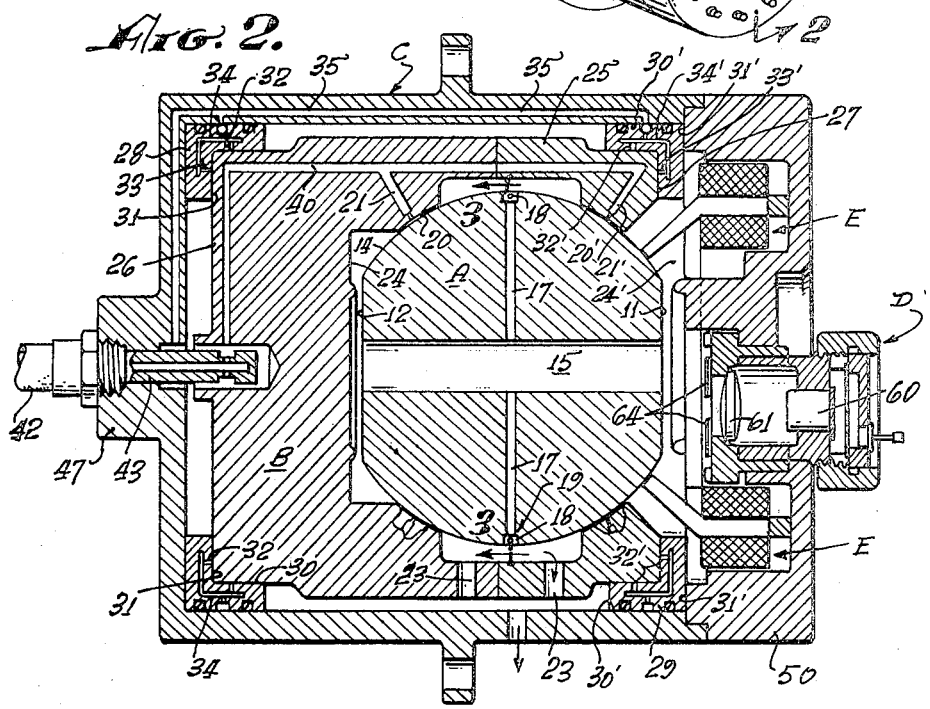
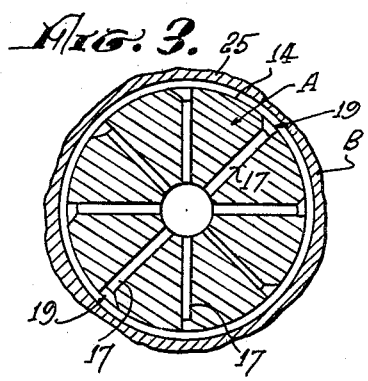
INVENTORS.
GERALD B. SPEEN,
RICHARD C. TURNBLADE,
By their Attorneys
Spensley & Horn.

United States Patent Office 3,482,454
Patented Dec. 9, 1969

3,482,454
GAS LUBRICATED REACTION GYROSCOPE
Gerald B. Speen and Richard C. Turnblade, Northridge, Calif., assignors to Conductron Corporation, Northridge, Calif., a corporation of Delaware
Filed Oct. 23, 1965, Ser. No. 503,859
Int. Cl. G01c 19/12
U.S. Cl. 74—5                                      9 Claims

ABSTRACT OF THE DISCLOSURE

A gyroscope comprising a casing in which a spherical rotor is caused to rotate about its spin axis by tangential gas reaction jets emerging from the rotor in the equatorial zone thereof. The rotor is contained in rotative relation by a gas supported bearing within a housing which is, in turn, mounted for free rotation on bearings in a stationary casing and is caused to rotate on its said bearings by viscous coupling with the rotor.

---

This invention relates in general to gyroscopes such as those employed in modern guidance systems and more particularly to an improved gas lubricated fluid pressure actuated precision gyroscope.

In modern guidance systems such as those used in guided missiles, rockets, aircraft and ships, the need for highly accurate reliable gyroscopic systems is well recognized. In inertial guidance systems, for example, the gyroscope is the key factor to the reliability, accuracy, and cost of the system. In such connection gas lubricated, free-rotor gyros have become well known to the art as shown for example, in U.S. Patents Nos. 2,729,106 and 2,940,381.

The present invention provides a gyroscope construction which makes possible substantial drift performance improvement over those devices heretofore known to the art together with an increased operational lifetime and decreased unit cost. In gyroscopes of the prior art, the accuracy of the device has been limited by precession and drift-causing factors. The present invention substantially obviates several such precession-causing torques.

In general terms, the gyroscope of the present invention comprises a spherical rotor supported upon a pair of annular or spherical segment gas bearings within a rotating housing. The rotor defines an axial opening with radial channels extending from the axial opening along the transverse plane through the rotor to the equator at a plurality of spaced locations along the equator. The housing within which the rotor is mounted defines polar cavities which are sealed such that gas flow from the gas bearings must flow to ambient by being emitted from the gas bearings and flowing directly to the equatorial region or by flowing into the polar cavities, through the axial opening of the rotor and out the radial channels to the ambient equatorial region. Thus, a portion of the gas used to support the rotor travels through the rotor channels in order to reach the ambient area at the equatorial region. In flowing from the radial channels, the gas is directed through tangential reaction nozzles causing the spherical rotor to rotate at high speed. The gas which supplies both the reaction driving force and the bearing support for the rotor then exits to ambient or the low-pressure side of the system.

The housing within which the rotor is supported is contained within an outer case of the gyro. The rotor housing is in turn mounted within the outer case such that it is free to rotate. The reaction driven rotor will cause rotation of the rotor housing within the outer case by means of the viscous coupling with the rotor support bearings fixed to the rotor housing. The rotor support housing thus rotates and any bearing oriented torques or precessional forces which would otherwise be applied to the rotor by reason of mechanical imperfections or flow unbalance between the support surfaces of the various bearings and the rotor surface are cancelled out or averaged by transposition. Means can be provided for controlling the rate of rotation of the rotor support housing to thereby retard the housing rotation rate induced by the viscous coupling. Since the driving means of the rotor is fixed to the rotor, there is no tendency on the part of the drive mechanism to cause alignment of the rotor to any external component and the rotor is thus suited to extremely good inertial reference since there is no inherent angular coupling due to a fixed drive mechanism.

In the gyroscope of the present invention, a two axis solid state optical pickoff which measures the angular position of the rotor supporting means relative to the rotor is employed. The pickoff per se forms no part of the present invention except in combination therewith and is of the type which is described and claimed in co-pending application Ser. No. 448,012. The gyroscope of the present invention also includes a torquing mechanism of the eddy current type suitable for use with a non-synchronous speed rotor. In its presently preferred form the gyroscope system of the present invention does not include a caging mechanism but such may be added if the application warrants.

The present invention provides a simple efficient and economical design where high accuracy of production and dimension is required only on the rotor and the bearing support surfaces. The construction of the present invention provides internal symmetry, a driving torque fixed to the rotor by the reaction drive, and a rotating gas bearing mount for the rotor to eliminate all non-acceleration sensitive bearing oriented drift-bias effects and precessional effects. By means of the construction of the present invention, no heat dissipating elements are present in the gyro drive unit to cause thermal gradients within the system. By means of the construction of the present invention, no special temperature regulation of the sensor is necessary nor are flotation fluids or buoyancy compensation systems required.

Thus, the construction of the present invention provides a self-propelled spherical free rotor having a preferred axis of rotation with very low friction rotor support having no observable static friction or frictional deadband. The gyroscope of the present invention has an unlimited operational lifetime of the rotor bearings since no physical contact exists between the rotor and its mountings. The gyroscope in accordance with the present invention has high acceleration and vibration response capability with no effective increase in the frictional restraints on the rotor. By means of the rotor and bearing construction of the present invention, the gyroscope has immediate start-up capability since no temperature stabilization is required.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawings:

FIGURE 1 is a drawing in perspective of the exterior of the assembled gyroscope in accordance with the present invention;

FIGURE 2 is a sectional view taken along line 2—2 of FIGURE 1;

FIGURE 3 is a sectional view taken along line 3—3 of FIGURE 2.

Referring now to the drawing and particularly to FIGURE 2, the primary components of the gyroscope in accordance with the present invention are the rotor, designated generally as A; a rotor support case B, within which the rotor is contained and which supplies the air bearing supports for the rotor; an outer case C within which the rotor support housing is in turn rotatably supported; an optical pickoff system D; and, a plurality of torquers E.

Referring now particularly to FIGURES 2 and 3, the rotor A of the present invention is a single piece spherical rotor. Unlike many rotors of the prior art the rotor of the present invention necessitates no assembly of critically dimensioned rotor components. Since the rotor is a single piece sphere its machineability can be accurately achieved by methods known to the art and the choice of materials is wide since there are no assembly problems. In the presently preferred embodiment, tungsten carbide is employed as the material of the rotor to thereby obtain maximum density advantage and dimensional stability. The use of such material allows optimized angular momentum capacity. As shown in FIGURE 2, the surface of the rotor is spherical with the exception of two polar flats which are designated as 11 and 12 on the drawing with the spherical surface being designated as 14. An axial opening 15 is defined by the spherical rotor along its axis which becomes the spin axis of the rotor. On the equatorial plane of the rotor transverse to the polar axial opening 15, there is provided a plurality of radially extending passages 17 which are the supply ducts for reaction nozzles which are mounted upon the equator of the rotor. Thus, the reaction ducts 17 extend in the equatorial plane to the equator designated 18 of the rotor. Upon the equator there is provided a reaction nozzle at the end of each rotation duct. The reaction nozzles are of the type well known to the art and in the present invention are metallic inserts which define the nozzle configuration. The nozzle 19 is thus in communication with the supply duct 17 and is oriented to exhaust gases flowing from the supply duct 17 tangentially to the equator. The plurality of reaction nozzles which are eight in the presently preferred embodiment thus produce the rotational force for the rotor when gas or air under pressure is supplied to the supply ducts 17 from the axial opening 15.

The rotor A is supported within the rotor support housing B. The rotor support housing B defined by its interior wall annular support surfaces 20 and 20'. Each of the surfaces is an annular portion of a sphere having a radius approximately equal to but greater than the radius of the rotor. The spherical segment bearings are designed with a geometry and orifice arrangement such that the net force vectors applied to the rotor are located with reference to the equatorial plane of the rotor as to obtain a rotor support characteristic which is as nearly isoelastic as possible. Accordingly, the bearing surfaces 20 and 20' are positioned at equidistant latitudes from the equatorial plane 18 of the rotor and define bearing orifices equally spaced about the circumference of the rotor at that latitude position. By way of example, in the presently preferred embodiment, six gas inlet openings 21 are positioned such that the net forces applied to the rotor by each bearing lies at latitude 35°15' from the equator 18 of the rotor and are equally spaced at about 60° intervals along the latitude plane and similarly, six gas inlet openings 21' are used in the bearing 20' at the opposite side of the equator between the equator 18 and the polar flat 11 and are spaced at approximately 60° intervals about that latitude. Each of these spherical segment bearing surfaces 20 and 20' are equal in spherical segmental area and are spaced at a predetermined distance from the spherical surface of the rotor. That is, the radius of the spherical surfaces 20 and 20' is approximately equal to but greater than the radius of the rotor by the spacing required to form the suitable gas bearing layer between the rotor and the spherical bearing surfaces. Such spacing will be determined by design considerations which dictate the thickness of the air or gas film necessary to support the rotor from the bearing surfaces for the environment in which the instrument must be operated. For example, in the present embodiment of the present invention wherein the overall size of the gyro assembly is approximately 2 inches in diameter by 3 inches in length and in which the speed of the rotor is 20,000 r.p.m., a spacing of 0.001 inch is utilized.

The rotor support housing also defines by its internal surface an annular equatorial cavity between the bearing surfaces 20 and 20' which cavity designated as 22 thereby surrounds the rotor at the equatorial region. As will be seen hereinafter, passages 23 are provided through the rotor support housing leading to the exterior thereof from the equatorial cavity 22 to allow the equatorial cavity to be maintained at ambient pressure. This ambient pressure will be the low-pressure side of the gas flow system within the gyro. Other gas exhaust systems are possible. Polar cavities 24 and 24' are defined by the interior wall of the rotor support housing and the outer case. The polar cavities 24 and 24' surround the rotor at those regions surrounding the polar flats 12 and 11, respectively. As will be seen hereinafter, these polar cavities 24 and 24' are at a pressure above ambient and thereby define a higher pressure than ambient but lower than that supplied to the bearings.

Referring to FIGURE 2, in order to define the annular segmental bearings and the cavities described hereinbefore, the rotor support housing is generally cylindrical in configuration with an open outer end extending from the limits of the outer bearing surfaces 20'. The exterior wall 25 of the rotor support housing is generally cylindrical in configuration and must be designed such that the polar cavities can be maintained in a pressurized condition. In the figure shown, the rotor support housing has a closed end wall 26 at the first end thereof and an annuar end wall segment 27 at the opposite end thereof. This allows the torquers E to extend through the said open end of the rotor support housing to operate directly on the rotor by applying torques oriented to the outer case. If the torquers are included on the rotor support housing, both polar areas would have closed end walls. When the annular end wall is used, pressurization of that end cavity is accomplished by virtue of the pressure isolation offered by the outer support gas bearings 29.

The end wall 26 and the annular end wall 27 are substantially transverse to the cylindrical wall 25 such that the rotor support housing can be supported in combination gas journal-thrust ring bearings 28 and 28' located at the respective ends of the rotor support housing. Separate gas journal bearings and thrust bearings can also be used or mechanical bearings also. The support bearings 28 and 29 are such that they support the rotating housing B which is rotated in response to the viscous coupling between the rotor and the support bearings 20 and 20'. In order to avoid undue speed of the gas supported rotating housing B the support bearings are built with an inherent opposing turbine torque or mechanical drag directed against the rotation of the housing as will be described more fully hereafter.

The support bearings for the rotating housing are as shown in FIGURE 2 simple integral gas journal thrust bearings with one bearing force operating at each end wall of the rotating case and the other bearing face operating upon the circumference of the case at each end thereof. Thus, as shown in FIGURE 2, the housing bearing supports are annular in configuration with one bearing surface 30 extending circumferentially around the exterior cylindrical wall of the rotating housing proximate the first end 26 thereof. The same annular bearing 28 has a transverse bearing wall 31 in bearing support to the transverse end wall 26 of the rotating housing. The bearing surfaces 30 and 31 are spaced from the cylindrical surface and the transverse end wall surface by a predetermined amount sufficient to allow an air bearing film to be generated between the surfaces by air or gas which is conducted to the bearing surfaces 30 and 31 through bearing orifices 32 and 33, respectively. These orifices are spaced at equal intervals around the circumference of the annular bearing and are supplied with gas under pressure from a bearing supply duct 4 which is an annular manifold that is in communication with a primary supply duct 35 which passes through the wall of the outer case which is described hereinafter. The second annular bearing 29 is positioned at the opposite end of the rotating housing and is similar in all respects to the bearing 28 previously described. That is, the bearing surfaces 30' and 31' are in contact with the circumferential surface of the rotating housing and the end wall thereof. The main supply duct 35 conducts gas under pressure to the manifold 34' from which gas under pressure is exhausted to the space between the bearing surfaces 30' and 31' and the circumferential wall and end wall of the rotating housing, respectively.

Thus, the rotating housing is free to rotate within the annular bearings 28 and 29 which are in turn affixed to the outer case C of the gyro assembly of the present invention. As discussed hereinbefore, rotation of the rotor A within the annular fluid bearings 20 and 20' will cause a viscous coupling of the rotor to the rotating housing B and will cause it to be rotated with the rotor in the same direction of rotation. The speed at which the rotating housing B will be dragged with the rotor will be at a lesser rate of rotation than the rotor itself. However, the speed which could be generated in the rotating housing would still be excessive and for that reason the outlet nozzles 32 and 32' and 33 and 33' of the two annular support bearings 28 and 29 are inclined from their normal perpendicular orientation and directed against the surface of the rotor support housing to exert a drag force upon the rotating housing to substantially reduce its speed. Thus, the nozzles are oriented partially tangentially to the surfaces of the rotating housing and directed oppositely to the direction which will be induced by the rotor. By this means it is possible to reduce the speed of rotation of the rotating housing to the desired level. If mechanical support bearings are employed, the frictional drag is adjusted to obtain the proper resistance to rotation. In the presently preferred embodiment, for example, the gyro assembly is so designed that a rotor speed of 20,000 r.p.m. is achieved while the speed of rotation of the rotor support housing is approximately 10 r.p.m. in the same direction. It will be seen by one skilled in the art that rather than gas bearings 28 and 29 it is possible that the rotating rotor housing can be rotatably supported by other means such as ball bearings and that such ball bearings could be preloaded to govern the speed of rotation of the housing B to the desired levels. In general, however, gas bearings such as those shown in connection with the presently preferred embodiment are preferable due to the increased operating lifetime.

The primary consideration in allowing the rotation of the rotating housing while restricting it to a low rate of rotation relative to the rotor is related to the objectives of causing minimal angular coupling of the rotor to the rotating rotor housing. In prior art gyroscope assemblies in which a rotating case was spun synchronously with the rotor, viscous coupling between the rotor and the rotating case was sufficient in extent to cause a noticeable aligning torque which generated an exponential return of the rotor axis to the rotating case axis when the two were initially offset. By utilizing the reaction drive on the rotor to cause it to spin at high speed and maintaining the rotor support housing at a speed of rotation which is a relatively few r.p.m., the time constant of the return of the rotor axis to the rotating case axis when the two are initially offset can be substantially increased. By causing the rotor support housing to be rotated at a relatively low rate with respect to the rotor any imperfections in the bearing surfaces 20 and 20', and deviations or differences in the bearing ducts or gas flow therefrom, or other forces which could generate a torque or precessional force between the rotor and its bearings are cancelled out by being varied in position relative to the rotor and the outer case.

Actually, the direction of rotation of the housing may be the same as or opposite to the direction of rotation of the rotor. The primary result sought is to cancel out differences and imperfections which might produce forces capable of generating undesirable precessional forces. The present invention, however, takes advantage of existing viscous forces and gives them this added novel utility of imparting rotation at a desired rate to the housing which serves as the bearing support for the rotor.

As can be seen from the foregoing two supply ducts are utilized in the present invention. The first supply duct 40 supplies the air or other gas under pressure to the gas bearings for the rotor which gas bearings are located in the rotor housing. The second supply duct 35 conducts air to the support bearings 28 and 29 which support the rotor housing relative to the stationary outer case of the device. A gas transfer mechanism is then required to supply gas under pressure to the duct 40 which in turn through suitable manifolds supplies gas to the air bearings 20 and 20'. Since the rotor support housing B is rotatably supported relative to the outer case C the gas transfer mechanism can be relatively simple. In the presently preferred embodiment as shown in FIGURE 2 a tubular air inlet is extended through the outer wall 41 of the outer case C substantially along the longitudinal axis or spin axis of the device. Air is then conducted through an air conduit 42 into a tubular member 43 which extends into the end wall of the rotor housing. The tubular member 43 has appropriate outlets in alignment with the first supply duct 40 and the second supply duct 35. Since both supply ducts are at the high pressure side of the gas flow the gas transfer problems are minimized. The gas flow can thus be seen to be from the inlet 45 outwardly from the conduit 43 and into the supply ducts 40 and 35 even though the supply duct 40 may be rotating about the stationary conduit 43.

From the foregoing it can be seen that the outer case for the gyro can take any external configuration, it being essential only that it be equipped with bearing means such as 28 and 28' to rotatably support the rotor housing B. In the presently preferred embodiment as shown in FIGURE 2 the outer case is formed in two portions and is generally cylindrical in both interior and exterior configuration. The outer case is closed at the end 41 and is equipped with a threaded air inlet connection 47 into which a suitable fitting for the air conduit 42 is fixed. The opposite end of the housing comprises an end cap 50. The end cap 50 contains torquing mechanisms and the optical pickoff D. The end cap 50 thus defines the polar cavity 24 as described hereinbefore.

The optical pickoff D is a two axis optical pickoff which measures the angular position of the rotor supporting means relative to the rotor and is of the type described in detail in co-pending application Ser. No. 448,012 assigned to the assignee of the present application. In this embodiment the pickoff elements briefly comprise an infrared laser diode 60 whose emission is collimated by a lens 61 to pass through a square aperture 62. Having passed through the aperture it is reflected off a polished mirror surface on the polar flat surface of the rotor and the reflected radiation slightly diverging returns to a set of silicon photosensitive cells 64 on the back side of the aperture. Any angular motion of the rotor causes a corresponding displacement of the reflected image on the cells and produces an asymmetric voltage output from the bridge connected cells. The laser diode is modulated. The photosensitive cell outputs are processed by a simple AC preamplifier and a synchronous demodulator to produce a DC output signal proportional to the angular position of the gyro rotor with respect to the pickoff axis. Other pickoffs, such as capacitive and inductive can also be used.

The torquing devices E are eddy current torquers suitable for use with a non-synchronous speed rotor. In the illustrative embodiment there are four torquer assemblies located on one end of the rotor. In certain cases, there is an advantage to having a second set of four torquers at the opposite side of the rotor. This arrangement can eliminate variations in torquer scale factor as the rotor deflects in its gas support bearings under accelerations allowing the rotor to get closer to one torquer pole than another. Other torquers such as motor type and electrostatic can also be used. The torquers per se are well known to the art as drag torquers, that is, the torquers pass a magnetic field through the rotor surface and cause eddy currents to flow in the conducting surface of the rotor. This effectively causes a point drag on the surface of the rotor which is eccentric to the rotating rotor and a torque is generated which causes the rotor to precess toward the torquer element. By using two torquers diametrically opposite in a push pull manner the rotor can be precessed as required.

By proper selection of materials and by using angular stops it has been found that a caging mechanism is not essential. However, it can be included if certain applications make it desirable. A brake can also be included to slow the rotor to low speed before turning off the gas supply if desired.

In the presently preferred embodiment by utilizing tungsten carbide as the material for the rotor, caging problems are minimized since the rotor will not be damaged by falling onto the bearing surfaces when the air bearing film is removed. In the illustrative embodiment simple stop surfaces 61 are provided and spaced from the polar flats to retain the rotor approximately in its proper position when the gyroscope is not operating.

Thus in operation air under pressure $P_1$ is passed from the inlet fitting to the annular inlet opening 45 and progresses to the supply ducts 40 and 35. The air under pressure then generates an air bearing through the annular thrust journal support bearings 28 and 28′ to rotatably support the rotor housing B. Air is also supplied under pressure through the supply duct 40 to the annular spherical segment bearing rings 20 and 20′ to rotatably support the rotor A within the rotor housing B. Since the equatorial recess 18 is at ambient due to the openings 23 and 24 from the rotor housing and from the outer case to the atmosphere the pressure surrounding the reaction nozzles of the rotor is maintained at atmospheric $P_3$. At the polar cavities 24 and 24′ air escaping from the air bearings 20 and 20′ builds to a pressure $P_2$ above atmospheric and passes into the axial opening 15 of the rotor. The axial opening of the rotor is therefore maintained above atmospheric at pressure $P_2$ which is less than the high pressure side of the system at $P_1$. The air at $P_2$ then passes from the axial opening 15 through the reaction ducts 17 and reaction nozzles 19 to drive the rotor at the desired speed.

While a presently preferred embodiment of the invention is disclosed in the foregoing drawings and specification, the invention is not to be deemed to be limited to precise details of construction thus disclosed since experience may indicate the desirability of variations therefrom. For example, while eight jets have been shown for imparting rotation to the rotor, it is obvious that any number of jets greater than one may be employed as may be found most satisfactory for a given situation. Accordingly, the invention shall be understood to embody all such changes and modifications in the parts, in the construction, combination and arrangement of parts as shall come within the purview of the appended claims.

What is claimed is:
1. A gyroscope apparatus including in combination:
a stationary hollow casing;
a rotor housing mounted in said casing for free rotational movement, said housing having a cavity formed therein including spaced spherically segmental bearing surfaces generated about a center coincident with the axial line of rotation of said housing;
a rotor freely rotatable within housing and having an exterior surface complementary to said bearing surfaces in said housing;
means directing a fluid current to impose a dynamic pressure force reacting tangentially upon said rotor with resultant rotation of said rotor about a spin axis normally coincident with the center about which said rotor surface is generated; and
gas contact means engaging said housing effective to cause independent rotation of said housing at a lesser rate than the rate of rotation of said rotor.

2. A gyroscope apparatus as claimed in claim 1 in which said housing is viscously coupled to said rotor for rotation therewith and in which jet orifice means for fluid under pressure includes means associated with the bearings between said housing and said casing for imposing a force on said housing yieldingly opposing rotation of said housing at a rate otherwise deriving from said viscous coupling with said rotor.

3. A gyroscope apparatus as claimed in claim 1 in which said fluid current directing means comprises a plurality of jet orifices disposed symmetrically laterally with respect to the equatorial plane of said rotor in uniformly spaced circumferential relation to each other and terminate in end portions extending uniformly tangentially to a circle not greater in diameter than the diameter of said rotor.

4. A reaction gyroscope comprising:
a substantially spherical rotor;
gas outlet means from the spherical surface of rotor for exerting by reaction a rotational force upon said rotor about a spin axis thereof;
means for conducting gas under pressure to said outlet means;
a rotor housing, said rotor being rotatably mounted within said housing;
a stationary gyroscope casing having bearings on which said housing is mounted for rotation about an axis coincident with the center about which the exterior surface of said rotor is generated;
said rotor housing being rotatably mounted on said bearings; and
means associated with said bearings resisting rotation of said housing within said casing to a lesser rate of rotation than the rate of said rotor.

5. A reaction gyroscope comprising:
a substantially spherical rotor, gas outlet nozzles positioned about the equator of said rotor, for exerting a reaction rotational force upon said rotor about a spin axis theref, an axial opening defined by said rotor about the spin axis thereof, radial supply ducts from said axial opening to said nozzles, said axial opening being at least one of the poles of said sphere, means for maintaining the gas pressure exteriorly of said sphere at the polar region thereof greater than at the equatorial region thereof;
a rotor housing, said rotor being rotatably mounted within said housing;
a stationary gyroscope casing having bearings on which said housing is mounted for rotation about an axis coincident with the center about which the exterior surface of said rotor is generated;
said rotor housing being mounted for free rotation within said casing by viscous coupling to said rotor; and means for restricting the rate of rotation of said housing within said casing to a lesser rate of rotation than the rate of said rotor.

6. A reaction gyroscope comprising:
a substantially spherical rotor, gas outlet nozzles positioned about the equator of said rotor, for exerting a reaction rotational force upon said rotor about a spin axis thereof, an axial opening defined by said rotor about the spin axis thereof, radial supply ducts from said axial opening to said nozzles, said axial opening being at least one of the poles of said sphere, means for maintaining the gas pressure exteriorly of said sphere at the polar region thereof greater than at the equatorial region thereof;
a rotor housing, said rotor housing defining gas bearings upon which said rotor is rotatably mounted, means for conducting gas to said bearings;
a stationary gyroscope casing;
said rotor housing being rotatably mounted within said casing on other gas bearings; and
means associated with said other gas bearings operative to restrict the rate of rotation of said housing within said casing to a lesser rate of rotation than the rate of said rotor.

7. A reaction gyroscope comprising:
a substantially spherical rotor, gas outlet nozzles positioned about the equator of said rotor, for exerting a reaction rotational force upon said rotor about a spin axis thereof, an axial opening defined by said rotor about the spin axis thereof, radial supply ducts from said axial opening to said nozzles, said axial opening being at least one of the poles of said sphere, means for maintaining the gas pressure exteriorly of said sphere at the polar region thereof greater than at the equatorial region thereof;
a rotor housing, said rotor housing defining gas bearings upon which said rotor is rotatably mounted, said bearings being spaced equidistantly from said equator at predetermined latitude positions relative to said rotor, means for supplying gas under pressure to said bearings and to said axial opening of said rotor;
a stationary gyroscope casing;
said rotor housing being rotatably mounted within said casing; and
means for rotating said housing within said casing at a lesser rate of rotation than said rotor.

8. A reaction gyroscope comprising:
a substantially spherical rotor, gas outlet nozzles positioned about the equator of said rotor, for exerting a reaction rotational force upon said rotor about a spin axis thereof, an axial opening defined by said rotor about the spin axis thereof, radial supply ducts from said axial opening to said nozzles, said axial opening being at least one of the poles of said sphere, means for maintaining the gas pressure exteriorly of said sphere at the polar region thereof greater than at the equatorial region thereof;
a rotor housing, said rotor housing defining gas bearings upon which said rotor is rotatably mounted, said bearings being spaced equidistantly from said equator at predetermined latitude positions relative to said rotor, means for supplying gas under pressure to said bearings and to said axial opening of said rotor;
a stationary gyroscope casing;
said rotor housing being rotatably mounted within said casing, said rotor housing being viscously coupled to said rotor by said bearings for rotation therewith; and
means for retarding the rotation of said rotor housing to a predetermined rate of rotation.

9. A gas lubricated reaction gyroscope comprising:
a substantially spherical rotor, gas outlet nozzles positioned about the equator of said rotor for exhausting gas with a tangential component to exert a rotational force upon said rotor about a spin axis transverse to said equator, an axial opening defined by said rotor at the spin axis thereof, radial supply ducts extending from axial opening to said reaction nozzles, said axial opening being in communication with the exterior of said rotor at a polar surface thereof;
a rotor housing, said rotor housing defining by its interior configuration an equatorial cavity, a polar cavity and annular gas bearing surfaces, said gas bearing surfaces being at equidistant latitudes relative to said rotor to rotatably position said rotor, means for maintaining the gas pressure within said equatorial cavity at ambient means for maintaining the gas pressure in said polar cavity above ambient;
a stationary gyroscope casing;
said rotor housing being rotatably mounted within said casing, said rotor housing being viscously coupled to said rotor by said bearings for rotation therewith; and
means for retarding the rotation of said rotor housing to a predetermined rate of rotation.

References Cited

UNITED STATES PATENTS

| | | | |
|---|---|---|---|
| 2,133,809 | 10/1938 | Carter et al. | 74—5.7 X |
| 2,380,578 | 7/1945 | Carlson | 74—5.7 |
| 2,729,106 | 1/1956 | Mathiesen | 74—5 X |
| 3,194,613 | 7/1965 | Pierry et al. | 74—5 X |
| 3,199,931 | 8/1965 | Martz. | |
| 3,257,854 | 6/1966 | Schneider et al. | 74—5.7 |
| 3,283,594 | 11/1966 | Parker | 74—5 X |

C. J. HUSAR, Primary Examiner